United States Patent [19]
Chung

[11] Patent Number: 5,400,180
[45] Date of Patent: Mar. 21, 1995

[54] PROJECTION TYPE DISPLAY DEVICE

[75] Inventor: Byoung H. Chung, Kyungki-Do, Rep. of Korea

[73] Assignee: Goldstar Co., Ltd., Seoul, Rep. of Korea

[21] Appl. No.: 981,596

[22] Filed: Nov. 25, 1992

[30] Foreign Application Priority Data

Nov. 27, 1991 [KR] Rep. of Korea ............... 21441/1991

[51] Int. Cl.$^6$ ............................................. G02B 27/14
[52] U.S. Cl. ..................................... 359/634; 348/757
[58] Field of Search ............... 359/629, 634, 636, 589; 358/60; 348/744, 756–757, 760

[56] References Cited

U.S. PATENT DOCUMENTS 4,687,301 8/1987 Ledebuhr ............................ 359/694

*Primary Examiner*—Loha Ben
*Assistant Examiner*—James Phan
*Attorney, Agent, or Firm*—Ostrolenk, Faber, Gerb & Soffen

[57] ABSTRACT

A projection type display device comprising a condensing lens and a total reflection mirror disposed downstream of a single light source, a pair of crossing dichroic mirrors disposed along the path of the light reflected from the total reflection mirror and adapted to achieve both the color separation and the color combination, image displays disposed respective paths of separated R, G and B color beams, and field lenses each disposed between each of the image display and the corresponding dichroic mirror and adapted to reverse the paths of R, g and B color beams. The beam combined by the dichroic mirrors and carrying R, G and B color images is transmitted through a central aperture of the total reflection mirror to a projection lens and then enlarged at the projection lens to be projected onto a screen. The display device is capable of achieving both the color separation and the color combination by using inexpensive dichroic mirrors in place of expensive dichroic prism and color filters.

2 Claims, 3 Drawing Sheets

PROJECTION TYPE DISPLAY DEVICE

BACKGROUND OF THE INVENTION

1. Field of the Invention

The present invention relates to a projection type display device, and more particularly to a projection type display device capable of achieving color separation and color combination simultaneously by using a pair of dichroic mirrors, and thus making the overall arrangement simple.

2. Description of the Prior Art

Referring to FIG. 1, there is illustrated a conventional projection type display device using reflection type displays. As shown in FIG. 1, the display device comprises a dichroic prism 1, three lamps 2a, 2b and 2c disposed at three places around the dichroic prism 1, respectively, red (R), green (G) and blue (B) color filters 3a, 3b and 3c disposed downstream of respective lamps 2a, 2b and 2c, condensing lenses 4a, 4b and 4c disposed downstream of respective color filters 3a, 3b and 3c, and total reflection mirrors 5a, 5b and 5c disposed downstream of respective condensing lenses 4a, 4b and 4c. Each of the total reflection mirrors 5a, 5b and 5c has a central aperture.

The display device also comprises field lenses 6a, 6b and 6c disposed oppositely to the dichroic prism 1 with respect to respective total reflection mirrors 5a, 5b and 5c and image displays $7_R$, $7_G$ and $7_B$ associated with respective field lenses 6a, 6b and 6c. A projection lens 8 is also disposed downstream of the dichroic prism 1.

In accordance with the above-mentioned arrangement of conventional projection type display device, respective lights emitted from the lamps 2a, 2b and 2c are transmitted to the color filters 3a, 3b and 3c disposed downstream of the lamps 2a, 2b and 2c. The color filters 3a, 3b and 3c serve to allow different monochromatic components, namely, R, G and B color beams of the lights to pass therethrough, respectively. These R, G and B color beams are focused by the condensing lenses 4a, 4b and 4c onto the pointing total reflection mirrors 5a, 5b and 5c and then reflected from the total reflection mirrors 5a, 5b and 5c, respectively. The R, G and B color beams are transmitted through respective field lenses 6a, 6b and 6c and thus changed into parallel beams. These parallel beams illuminate the image displays $7_R$, $7_G$ and $7_B$. These R, G and B color beams illuminating the image displays $7_R$, $7_G$ and $7_B$ are then reflected to be transmitted through the field lenses 6a, 6b and 6c, respectively. The field lenses 6a, 6b and 6c serve to reverse the paths of R, G and B color beams so that the R, G and B color beams are focused at respective central apertures of total reflection mirrors 5a, 5b and 5c and then transmitted through the same central apertures to the dichroic prism 1.

In the dichroic prism 1, the R, G and B color beams incident in three directions travel their predetermined reflection and transmission paths and then a combination path. At the combination path, the R, G and B color beams are combined into a full color beam which is, in turn, transmitted to the projection lens 8 disposed downstream of the dichroic prism 1. The full color beam combined in the dichroic prism 1 is enlarged by the projection lens 8 and then projected onto a screen 9 disposed downstream of the projection lens 8 to produce an image on the screen 9. Thus, the full color image is displayed on the screen 9.

However, the above-mentioned projection type display device equipped with conventional reflection type image display has a complex arrangement requiring many constituting elements, since it uses three sets of lamps, color filters, condensing lenses and total reflection mirrors, for achieving a R, G and B color or separation. The conventional display device also has a disadvantage of an expensive manufacture cost, in that it uses the dichroic prism which is expensive and difficult to be manufacture.

Furthermore, the conventional display device has a disadvantage of an inefficiency in light utilization, since a color filter functions to transmit only one among R, G and B beams of each of the lights emitted from three lamps and absorb the remainders, thereby causing the utilization rate of light emitted from each lamp to be reduced by $\frac{1}{3}$.

SUMMARY OF THE INVENTION

Therefore, an object of the invention is to eliminate the above-mentioned disadvantages encountered in the conventional projection type display device and to provide a projection type display device capable of simplifying the overall arrangement thereof.

Another object of the invention is to provide a projection type display device capable of reducing the manufacture cost.

Another object of the invention is to provide a projection type display device capable of increasing the efficiency of utilizing light emitted from a light source.

In accordance with the present invention, these object can be accomplished by providing a projection type display device comprising: a light source for emitting a light; condensing means disposed downstream of the light source and adapted to focus the light from the light source; total reflection means disposed downstream of the condensing means and adapted to reflect totally the light focused by the condensing means at a predetermined angle, the total reflection means having an aperture at its predetermined position; color separation and combination means inclinedly arranged at a predetermined angle with respect to the optical axis of the light reflected from the total reflection means and adapted to separate the light reflected from the total reflection means into R, G and B color beams and combine the R, G and B color beams returned thereto along their reversed paths; parallel beam generating means adapted to change the separated R, G and B color beams from the color separation and combination means into respective parallel beams, transmit the parallel beams to corresponding color image displays for producing R, G and B color images and reverse the paths of the R, G and B color beams, so as to return the R, G and B color beams carrying the R, G and B color images to the color separation and combination means; and projection means adapted to project the combined beam carrying the R, G and B color images onto a screen at a desired size.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
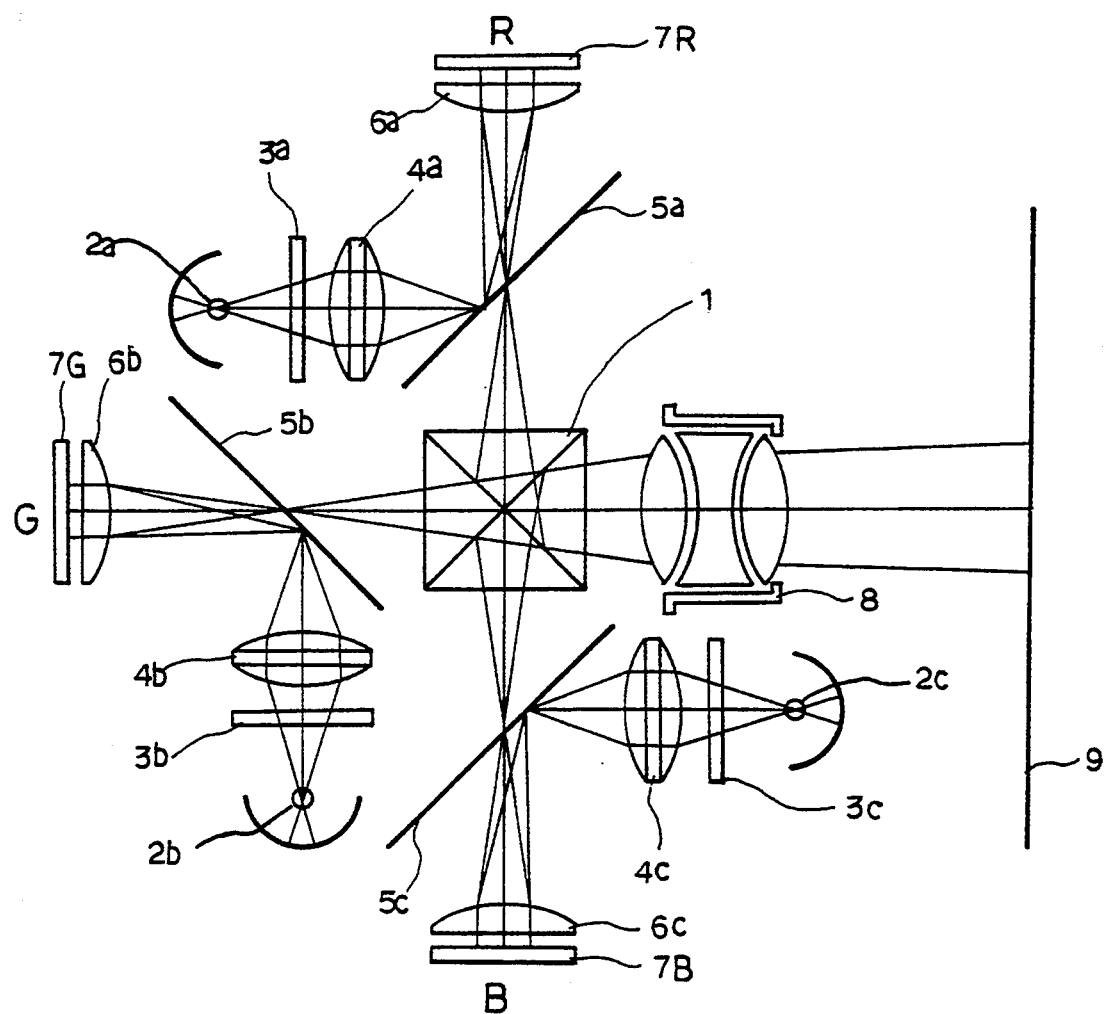
FIG. 1 is a schematic view of a conventional projection type display device.
Figure 2:
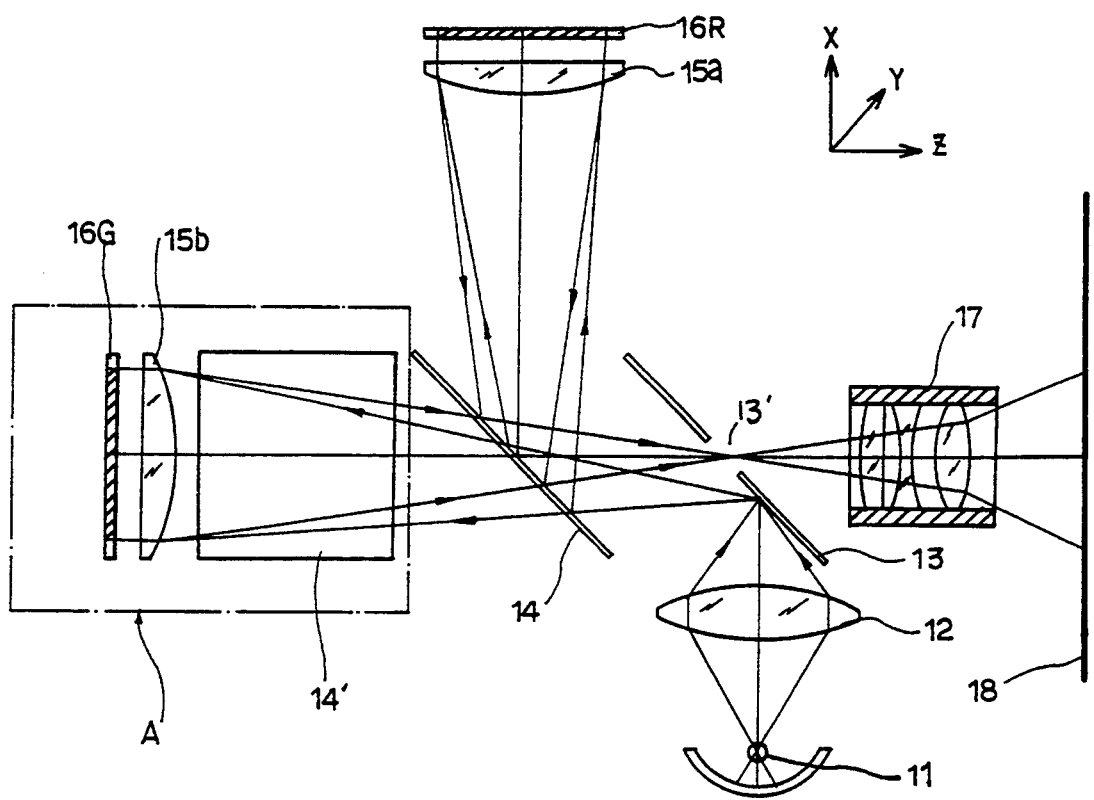
FIG. 2 is a plan view of a projection type display device in accordance with the present invention, viewed in a X-Y plane.
Figure 3:
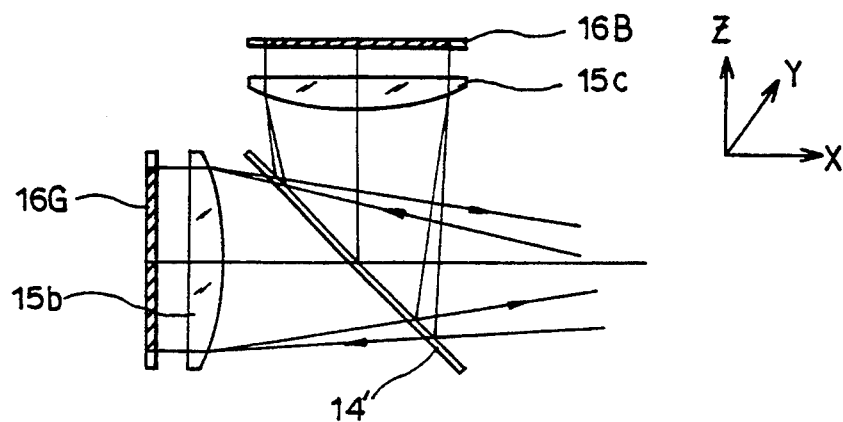
FIG. 3 is a plan view of a portion "A" in FIG. 2, viewed in a X-Z plane.

Referring to FIGS. 2 and 3, there is illustrated a projection type display device in accordance with the present invention. FIG. 1 shows the projection type display device in a X-Y plan view. On the other hand, FIG. 2 shows the projection type display device in a X-Z plan view.

As shown in FIGS. 2 and 3, the display device comprises a light source 11, a condensing lens 12 disposed downstream of the light source 11 and adapted to focus beams of the light emitted from the light source 11, and a total reflection mirror 13 adapted to reflect the beams focused by the condensing lens 12 thereon at a predetermined angle and provided with a central aperture 13'.

A first dichroic mirror 14 is disposed downstream of the total reflection mirror 13 and adapted to reflect a selected one among the R, G and B color beams reflected from the total reflection mirror 13 and transmit the remainders. Downstream of the first dichroic mirror 14 is disposed a second dichroic mirror 14' which serves to reflect a selected one of the beams transmitted through the first dichroic mirror 14 and transmit the other. The first and second dichroic mirrors 14 and 14' are inclinedly arranged at an angle of 45° with respect to an optical axis of the total reflection mirror 13.

The display device also comprises field lenses 15a, 15b and 15c disposed on respective reflection paths of the dichroic mirrors 14 and 14' and image displays 16$_R$, 16$_G$ and 16$_B$ disposed on respective transmission paths of field lenses 15a, 15b and 15c. The field lenses 15a, 15b and 15c serve to transmit the reflected beams and the transmitted beam to the corresponding image displays 16$_R$, 16$_G$ and 16$_B$ in the form of parallel beams and then transmitted the beams reflected from the image displays 16$_R$, 16$_G$ and 16$_B$ to the first and second dichroic mirrors 14 and 14' in the form of beam spots, respectively.

The beams incident on the first and second dichroic mirrors 14 and 14' travel reflection and transmission paths defined by the same dichroic mirrors to be combined together to form a full color beam. The full color beam is then focused at the central aperture 13' of total reflection mirror 13.

Downstream of the total reflection mirror 13, a projection lens 17 is disposed which serves to enlarge the full color beam transmitted through the aperture 13' of total reflection mirror 13 thereto and then project the enlarged beam to a screen 18 disposed downstream of the projection lens 17.

The procedures that the light emitted from the light source is transmitted through the projection lens 17 to produce an image on the screen 18 in the display device with the above-mentioned arrangement will be now described.

The light emitted from the light source 11 is focused at the condensing lens 12 and then reflected from the surface of total reflection mirror 13 in the form of substantially a point. Thereafter, the light is transmitted to the first dichroic mirror 14 inclinedly arranged at an angle of 45° with respect to the optical axis.

The first dichroic mirror 14 serves to reflect only the R color beam among the R, G and B color beams of the light transmitted thereto and transmit the remainders therethrough. Accordingly, the R color beam is transmitted through the field lens 15a to the R color image display 16$_R$, while the remainders, namely, the G and B color or beams are transmitted through the first dichroic mirror 14 to the second dichroic mirror 14'. The second dichroic mirror 14' serves to transmit the G color beam therethrough and reflect the B color beam therefrom. Accordingly, the G color beam is transmitted through the field lens 15b to the G color image display 16$_G$, while the B color beam is transmitted through the field lens 15c to the B color image display 16B. Thus, the separation of R, G and B color beams is achieved by two dichroic mirrors 14 and 14'.

At the image displays 16$_R$, 16$_G$ and 16$_B$, images corresponding to the incident R, G and B color beams are produced and reflected. The field lenses 15a, 15b and 15c reverse respective transmission paths of R, G and B color images to combine the R, G and B color images in the form of a point at the central aperture 13' of total reflection mirror 13.

The combination of images reflected from the image displays 16$_R$, 16$_G$ and 16$_B$ is achieved in reverse to the beam separation. This combination procedure will be described hereinafter.

As shown in FIG. 3, the beam carrying the G color image reflected from the G color image display 16$_G$ and then emerging from the field lens 15b is transmitted through the second dichroic mirror 14'. At this time, the beam carrying the B color image reflected from the B color image display 16$_B$ and then emerging from the field lens 15c is transmitted to the second dichroic mirror 14' and then reflected from the second dichroic mirror 14' so that it is combined with the beam carrying the G color image transmitted through the second dichroic mirror 14'. The combined beam carrying the B-G color image is transmitted through the first dichroic mirror 14 and then combined with the beam carrying the R color image emerging from the R color image display 16$_R$ and then reflected from the first dichroic mirror 14. Thus, the full color combination is completed.

The beam carrying the combined R, G and B color image travels a path directed through the central aperture 13' of total reflection mirror 13 to the projection lens 17. The beam is enlarged at the projection lens 17 and then transmitted to the screen 18, so as to produce a full color image on the screen 18.

As apparent from the above description, the present invention provides a projection type display device capable of achieving both the color separation and the color combination by using inexpensive dichroic mirrors in place of expensive dichroic prism and color filters. As a result, the present invention makes it possible to reduce the number of constituting elements such as condensing lenses and total reflection mirrors and thus to reduce the manufacture cost and provide improvements in compactness and reliance. Moreover, the present invention provides an effect of enhancing the light utilization efficiency, in that the color separation of the light emitted from a single lamp is achieved by the dichroic mirrors, without using any color filter and generating a loss of light.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A projection type display device comprising:

a light source for emitting a light;

condensing means disposed downstream of the light source and adapted to focus the light from the light source;

total reflection means disposed downstream of the condensing means and adapted to reflect totally the light focused by the condensing means at a predetermined angle, the total reflection means having an aperture at a predetermined position thereof;

color separation and combination means inclinedly arranged at a predetermined angle with respect to the optical axis of the light reflected from the total reflection means and adapted to separate the light reflected from the total reflection means into R, G and B color beams and combine the R, G and B color beams returned thereto along their reversed paths;

parallel beam generating means adapted to change the separated R, G and B color beams from the color separation and combination means into respective parallel beams, transmit the parallel beams to corresponding color image displays for producing R, G and B color images and reverse the paths of the R, G and B color beams, so as to return the R, G and B color beams carrying the R, G and B color images to the color separation and combination means, wherein the returned R, G and B color beams are combined into a beam carrying the R, G and B color images; and projection means adapted to receive and project the combined beam carrying the R, G and B color images onto a screen at a desired size;

wherein the color separation and combination means comprises:

a first dichroic mirror adapted to reflect a selected color beam among the R, G and B color beams reflected from the total reflection means onto its corresponding color image display and transmit the remainder therethrough; and a second dichroic mirror adapted to reflect a selected one from the remaining color components of the light transmitted through the first dichroic mirror, to its corresponding color image display and transmit the other color components to the remaining corresponding color image display.

2. A projection type display device in accordance with claim 1, wherein the first dichroic mirror is also adapted to combine the returned R, G and B color beams.

* * * * *